United States Patent

[11] 3,627,636

| [72] | Inventors | Gerald Myer Jaffe;<br>William Szkrybalo, both of Verona; Peter Hans Weinert, Wayne, all of N.J. |
|---|---|---|
| [21] | Appl. No. | 863,333 |
| [22] | Filed | Oct. 2, 1969 |
| [45] | Patented | Dec. 14, 1971 |
| [73] | Assignee | Hoffmann-La Roche Inc.<br>Nutley, N.J. |

[54] MANUFACTURE OF XYLITOL
20 Claims, No Drawings

[52] U.S. Cl. .................................................. 195/11,
127/37, 260/635 C
[51] Int. Cl. ........................................................ C12b 1/00
[50] Field of Search ............................................. 195/2, 7,
11, 37, 39, 33; 260/635 C; 127/37, 40

[56] References Cited
UNITED STATES PATENTS

| 3,479,248 | 11/1969 | Nobile ........................... | 127/40 |
| 2,142,739 | 1/1939 | Wallace ........................ | 195/2 |

OTHER REFERENCES

Cook, The Chemistry & Biology of Yeasts, p. 276– 8, Academic Press Inc., N.Y. 1958.

Fukuwatari et al., Chem. Abs. Vol. 61, No. 2041f, 1964.

Primary Examiner—A. Louis Monacell
Assistant Examiner—Gary M. Nath
Attorneys—Samuel L. Welt, Jon S. Saxe, Bernard S. Leon, William H. Epstein and George M. Gould ABSTRACT: A process for producing xylitol from lignin-free hemicellulose materials wherein the polysaccharides have been converted to monosaccharides, subjecting said materials to fermentation with a hexose fermenting yeast and thereafter hydrogenating said aqueous medium.

MANUFACTURE OF XYLITOL

BACKGROUND OF THE INVENTION

Xylitol, a sweetening agent, has been prepared via xylose from hemicellulosic material. The xylose that is obtained from hemicellulosic materials suffers from the disadvantage that it is produced along with a mixture of pentoses and hexoses which can only be separated into individual components with great difficulty and high losses. Furthermore, these separation and purification techniques have proven to be both expensive and time-consuming.

The xylose which is utilized as an intermediate for xylitol, must be free from substantially all impurities, i.e., other pentoses and hexoses. This is true since even slight impurities in the xylose prevent it from being reduced to xylitol. Generally, the reduction of the aldehyde or keto groups of a reducing sugar such as xylose to produce xylitol has been carried out by known methods such as in a chemical or catalytic manner. For example, xylose has been reduced to xylitol with the aid of a sodium amalgam or in the presence of a nickel catalyst. However, in order to carry out this reaction, it is necessary to utilize pure xylose since slight impurities can poison the catalyst and cause a standstill in this reduction step. This standstill results in the inability to continue carrying out the reduction reaction.

In order to overcome these disadvantages, it has been proposed to produce xylose by utilizing as starting materials, only those materials which have a high-xylose content and very low content of other sugars such as the hexoses. These materials are rather expensive and impurities still have to be removed from the xylose by expensive and time-consuming procedures, and with high losses. Furthermore, in these procedures, the xylose has to be isolated in crystalline form before it can be converted to xylitol. Therefore, it has long been desired to provide a means for producing substantially chemically pure xylose from inexpensive cellulosic materials without the necessity for utilizing expensive and cumbersome isolation and separation techniques.

SUMMARY OF THE INVENTION

In accordance with this invention, xylitol can be directly produced from lignin-free hemicellulosic materials which have all of their polysaccharides converted to monosaccharides, by first fermenting these materials in an aqueous solution with a hexose fermentation yeast which is inert to pentoses, then successively passing the aqueous medium after separation of the fermentation material through a cation ion exchange resin bed and then an anion ion exchange resin bed and finally hydrogenating the effluent from said resin bed in a conventional manner to form xylitol.

In accordance with this process, it has been found that the xylose produced from lignin-free hemicellulosic materials by fermentation has such a high degree of purity, that hydrogenation of the xylose in the reaction medium proceeds without the danger of the hydrogenation process coming to a standstill. Furthermore, by this process, substantially chemically pure xylitol can be obtained from relatively inexpensive cellulosic materials such as pulp sulfite liquors and aqueous wood extracts which are waste products of the pulp and paper industry without the necessity of utilizing expensive and cumbersome separation and purification techniques. Additionally, the aqueous solution containing the xylose is so free from impurities that it can be directly hydrogenated to xylitol without the necessity of isolating the xylose in crystalline form from the aqueous medium. Accordingly, a direct process is provided for converting hemicellulose materials to xylitol without isolation of xylose thereby giving higher yields and requiring fewer operations.

DETAILED DESCRIPTION

In accordance with this invention, xylitol is produced by hydrogenating xylose which has been produced from hemicellulosic materials. As the starting material, any conventional hemicellulosic materials containing xylan and cellulose can be utilized. These hemicellulosic materials generally contain lignins and carbohydrates which are mixtures of mononomers and polymers of saccharide materials such as hexoses and pentoses.

Among the suitable hemicellulosic materials for carrying out the process in accordance with this invention are included all angiosperms, that is both monocotyledonous plants such as grasses, (e.g., oats, bagasse or maize) and dicotyledonous plants such as conifers, deciduous trees (e.g., beech, poplar, birch or alder). Of the starting materials quoted by way of example, beechwood, which is available in large quantities and has small economic value is especially useful. Especially suitable are freshly cut and air-dried beechwood shavings.

The polysaccharides are converted to monosaccharides and the lignin is removed from these hemicellulosic materials by conventional procedures well-known in the art. One of the commonly utilized procedures for converting the polysaccharides in these materials to monosaccharides is by hydrolyzing these materials with an acid hydrolyzing agent. Any conventional acid hydrolyzing agent can be utilized such as the inorganic mineral acids, i.e., sulfuric acid, hydrochloric acid, etc. and the organic acids such as the lower halogenated alkanoic acids, i.e., trichloroacetic acid, monochloroacetic acid, etc. Generally, inorganic acids such as sulfuric acid is preferred in this process. The inorganic acids can be utilized in either their dilute or concentrated forms. The acid hydrolyzing agent can be present in the aqueous solution in an amount of from about 1 percent by weight to about 20 percent by weight of the solid content of the water hydrolysate to be hydrolyzed. The treatment with the acid hydrolyzes the polysaccharides to the monosaccharides and converts the lignins into insoluble materials which can be removed by filtration. The hydrolysis reaction can take place at room temperature, i.e., about 20° to 30° C. Generally, it is preferred, in carrying out the hydrolysis, to utilize elevated temperatures, i.e., from 55° to 150° C. Atmospheric pressure or elevated pressure can be utilized. Generally, it is preferred to carry out this reaction under pressure, i.e., from about 5 to 100 p.s.i.g.

Alternatively, the lignins can be removed after hydrolysis by passing an aqueous solution of the hydrolyzed cellulosic materials through an ion exchange resin bed. Any conventional ion exchange resin can be utilized for this purpose. The ion exchange resin employed for these purposes includes both cationic and anionic resins.

The anion exchange resins include polystyrene containing quaternary ammonium groups or substituted amines such as $-N(C_3H_6)_2$, polycondensation products of phenol and formaldehyde containing amino groups, polymerization products of aromatic amines and formaldehyde, guanidine-formaldehyde resins, polyamines, phenol-formaldehyde resins, etc. These anionic resins are commercially available under such trade names as:

Amberlite (types IR–4B, IR–45, IRA–4 10, IRA 400, IRA 93) (Rohm & Haas).
Dowex (types 1 and 2) (Dow Corning).
Wofatite M. (I.G. Farben).
Permutit S (Permutit A.G.).
Kastel A–300 etc. (Montecatini).
Permutit DR (Permutit A.G.)

Any conventional cationic ion exchange resin can be utilized in this reaction. Among the preferred cationic ion exchange resins are included the nuclear sulfonic acid cationic ion exchange resins such as polystyrene sulfonic acid type resins sold under trade names such as IR–120 and Dowex 50.

The passage through an ion exchange resin bed of an aqueous solution formed through hydrolyzing the hemicellulosic materials decolorizes the aqueous solution and removes any entrained lignin particles. The effluent coming from the bed is thereby decolorized and has all of the lignin particles removed therefrom.

In accordance with a preferred embodiment of this invention, the xylitol is produced from aqueous wood extracts or pulp sulfite spent liquors which are waste products from the pulp and paper industry.

The aqueous extraction products of wood and wood chips are waste materials of the pulp and paper making industry. These extracts are obtained by treating wood or wood chips with water or steam at temperatures of from 110° to 190° C. and at pressures of from about 15 to 20 lbs. per square inch gauge. The steam and water extracts the carbohydrates and lignins from the wood into an aqueous medium.

The aqueous wood extracts generally contain lignins, polysaccharides and monosaccharides. These monosaccharides include pentose and hexose sugars such as glucose, mannose, galactose, xylose, and arabinose. The polysaccharides include the polymeric forms of these hexose and pentose sugars. Generally, based upon its solids content, the wood hydrolysates contain from about 5 to 30 percent by weight of lignins, and from about 70 to 95 percent by weight of carbohydrates which include both polysaccharides and monosaccharides. Generally, the aqueous wood extracts contain from 10 to 40 percent by weight of xylose based upon the solids content of the aqueous wood extracts. These aqueous wood extracts are generally prepared as an aqueous solution or in the form of a concentrated liquid, i.e., a liquid having a solids content of from 40 to 60 percent and a water content of from 40 to 60 percent by weight. The amount of constituents and components in the solids of the aqueous wood extracts vary according to the season of the year, the type of wood and the wood-treating conditions. By way of example, hard wood provides a higher amount of pentose sugar than soft wood, and, in this connection the carbohydrates in the aqueous wood extracts are predominantly pentoses. On the other hand, in the case of the treatment of soft wood, carbohydrates in the aqueous wood extracts are mainly hexoses.

When the aqueous wood extracts are hydrolyzed in the aforementioned manner the lignins are removed and the polysaccharides are converted into monosaccharides.

Pulp sulfite liquor, another preferred starting material, is a byproduct of the paper making industry and results from the manufacture of wood pulp by by the sulfite process. Generally speaking, the digestion of wood by the sulfite process removes about 30 to 50 percent by weight of the original wood chips, this removed material being in the spent sulfite liquor. As is well known, the principle constituents of the dissolved wood materials are lignins which are in the form of lignosulfonates and carbohydrates. The carbohydrates in the spent sulfite liquor are in their monosaccharide form. Therefore, there is no need to convert the polysaccharides into the monosaccharides from the spent sulfite liquor. Lignins are removed from the spent sulfite liquor by conventional techniques such as by passage through anionic ion exchange resins wherein any of the conventional anionic ion exchange resins mentioned hereinbefore are utilized for this purpose of removing the lignins. The spent sulfite liquors can also be passed, prior to treatment with an anionic resin, through a conventional cationic exchange resin to remove any substituents and neutralize the liquor.

The spent sulfite liquors, based upon its solids content, contain from about 10 to 50 percent by weight of lignins and from 50 to 90percent by weight of carbohydrates which are in their monosaccharide form. Generally, these spent sulfite liquors contain from 10 to 40 percent by weight of xylose, based upon their solids content. These spent sulfite liquors are generally prepared as an aqueous solution or in the form of a concentrated liquid, i.e., a liquid having solids content of from 40 to 60 percent and a water content of from 40 to 60 percent by weight. The amount of constituents and components in the solids vary according to the season of the year, the type of wood and the wood-treating conditions. By way of example, hard wood generally provides a higher amount of pentose sugars than soft wood, and, in this connection, the carbohydrates in the spent liquor from the treatment of hard wood are predominantly pentoses. On the other hand, in the case of the treatment of soft wood, carbohydrates in the liquor are mainly hexoses.

The lignin-free hemicellulosic material having its polysaccharides converted to monosaccharides is next fermented in an aqueous medium with a yeast capable of fermenting hexoses and which is inert to pentoses. Among the conventional hexose fermenting yeasts which are inert to pentoses are included any of the strains of Saccharomyces. Among the strains are included Saccharomyces cerevisiae (ATCC 4132, 4110, 2704), Saccharomyces fragilis (ATCC 10022, 860), Saccharomyces carlsbergensis, Saccharomyces pastoanus, Saccharomyces marxianus, etc. The preferred yeasts are Bakers yeast and Brewers yeast.

In carrying out the fermentation reaction, any conventional nutrient medium containing an assimilable nitrogen source can be added to the reaction medium. Numerous animal, vegetable, microbial, as well as inorganic nitrogen compounds, (e.g., meat extract, peptone, tryptone, cornsteep liquor, yeast extract, amino acids, urea ammonium salts, as well as salts of nitric acid) can be used as these assimilable nitrogen salts. In accordance with this invention, the nutrient medium may contain any conventional assimilable carbon source. The nutrient medium can also contain trace elements originating from mineral or organic ingredients such as trace metals, vitamins, nicotinic acid, thiamine, etc.

The fermentation reaction can be carried out at room temperature. However, temperatures above and below room temperature can be utilized. Generally, temperatures of from about 5° to 40° C., with 25 to 35° C. being preferred, are utilized in carrying out this fermentation reaction. The fermentation reaction is carried out with a pH from 3 to 7, with 4 to 6 being preferred. Various salts or acids thereof can be added to the reaction medium to adjust the pH to within the range specified. These salts include potassium phosphates, sodium phosphates, potassium bicarbonate and sodium bicarbonate. Fermentation can be carried out for a period of at least one-half hour. If desired, it can be carried out for longer periods of time, i.e., up to 72 hours or longer. The aqueous solution which is to be fermented usually contains from about 1 percent by weight to about 35 percent by weight of the lignin free hemicellulosic material, whose polysaccharides have been converted to monosaccharides. Fermentation of this aqueous solution removes all of the hexoses from the reaction mixture. After fermentation has been complete, the resulting aqueous solution containing the xylose can be separated from the solid fermentation medium by any conventional means such as filtration.

In accordance with this invention, the aqueous solution resulting from fermentation is then passed first through a cationic ion exchange resin bed and then through an anionic ion exchange resin bed. Any conventional cationic ion exchange resins such as the resins hereinbefore mentioned can be utilized. After passing the reaction medium containing the xylose through the cationic ion exchange resin bed, the reaction medium is passed through an anionic ion exchange resin bed. Any of the conventional anionic ion exchange resins such as those hereinbefore mentioned can be utilized in accordance with this invention.

In order to provide the xylose for direct conversion into xylitol without isolation, it is necessary to pass the aqueous solution resulting from fermentation first through a cationic ion exchange resin bed and then through an anionic ion exchange resin bed. Successively passing the reaction medium through a cationic ion exchange resin bed and then through an anionic ion exchange resin bed removes all of the entrained and residual impurities from the xylose solution. If desired, the xylose can be recovered in crystalline form from the aqueous medium by conventional means such as evaporation. However, since this aqueous solution can be directly hydrogenated to convert the xylose to xylitol, it is seldom necessary to isolate the xylose.

The hydrogenation of xylose to xylitol is carried out in an aqueous medium. This hydrogenation can be carried out in a chemical or catalytic way for example, by utilizing sodium amalgam or a complex metal hydride, such as lithium borohydride or sodium borohydride. Generally, it is preferred to carry out the hydrogenation with hydrogen gas in the presence of a catalyst for example a noble metal catalyst such as platinum or palladium. Especially preferred are nickel catalysts such as Raney-nickel. However, any conventional means of hydrogenating an aldehyde or ketone can be utilized in accordance with this invention.

The hydrogenation can be carried out under any conventional hydrogenating conditions. Any temperature of from 70° to 120° C. and hydrogen pressure of from 10 atm. (gauge) to about 50 atm. (gauge) can be utilized. The hydrogenation of xylose to xylitol is preferably carried out in aqueous medium and pH of 3 to 10, preferable from 6 to 8, and at a hydrogen atmosphere of about 30 atm. (gauge) and a temperature of from 105° to 110° C. The hydrogenation proceeds quantitatively. The solid catalyst system can be removed from the aqueous solution containing the xylitol after the reaction is completed by conventional means such as filtration. The xylitol can be recovered from the aqueous medium by any conventional means such as evaporation. The xylitol crystallizes easily from a lower alkanol such as methanol, ethanol or from lower alkanol water mixtures.

If desired, the reaction medium from the hydrogenation reaction can be passed through a cationic and an anionic ion exchange resin bed to remove any residual impurities. Any conventional cationic and anionic ion exchange resin such as those hereinbefore mentioned can be utilized, if desired. After passing the aqueous hydrogenation reaction medium first through a cationic ion exchange resin bed and then through an anionic ion exchange resin bed, the xylitol can be recovered from the effluent by any conventional means such as by crystallization from a lower alkanol.

The invention is further illustrated by the following examples, which are illustrative but not limitative of the invention.

EXAMPLE 1

To 235 ml. of water, there was added 200 grams of Masonex syrup, a wood hydrolysate, having the following composition:

| Component | % by Weight |
| --- | --- |
| 1. Water | 40 |
| 2. Solids | 60 |
| a. Non-carbohydrates | |
| 1. Ash | 4.7 |
| b. Carbohydrates which are present in their polysaccharide form | |
| 1. Glucose | 4.4 |
| 2. Mannose | 3.8 |
| 3. Galactose | 1.1 |
| 4. Arabinose | 1.9 |
| 5. Xylose | 16.0 |

After the Masonex was mixed with water, 8.8 ml. of concentrated sulfuric acid was added. The resulting dark brown viscous solution (400 ml. volume) was divided into four portions and heated in four sealed 200 ml. heavy-walled Pyrex pressure flasks at 120° C. for 3.5 hours. The black-brown hydrolysates were cooled, combined, neutralized with 11.9 g. calcium hydroxide and filtered. The filtrate was passed through an anionic ion exchange column containing 350 cc. of Permutit DR (a phenylene diamine-formaldehyde anionic ion condensation resin). The resin was washed with 1400 ml. of water. Both eluants were combined and concentrated under vacuum at 45° C. to about 200 ml. The residual calcium sulfate precipitate (5–6 g. dry weight) was filtered, washed with a small amount of water. The filtrate contained 30.6 g. of xylose.

EXAMPLE 2

An inoculum was prepared from 150 ml. water, 16 g. Saccharomyces cerevisiae (dry active Bakers yeast) (ATCC 7754), 1 g. dipotassium hydrogen phosphate, 1 g. ammonium dihydrogen phosphate, 1 g. yeast extract and 2 g. glucose. The mixture was incubated at 27°–30° C. for 30 minutes with gentle agitation in a 2 liter three-neck round bottom flask, during this time a vigorous $CO_2$ evolution commenced.

To the inoculum was added the filtrate prepared in example 1, which was diluted with water to 300 ml. The fermentation was continued at 27°–30° C. for 15 hours. During this period the initial strong $CO_2$ evolution abated and almost completely ceased.

The fermentation broth was filtered through an asbestos pad (6μ porosity) to remove the yeast which was washed three times with a total of 300 ml. water. The yeast was stored at 0° C. for later use. The clear, dark yellow filtrate was passed successively through two ion exchange resin columns, respectively. The first column into which the filtrate was passed contained 1200 ml. Amberlite IR–120 (polystyrene divinyl benzene sulfonate cationic ion exchange resin in its $H^+$ form). The second column through which the filtrate passed contained Amberlite IR–A–93 [a polystyrene divinyl benzene tertiary amine anionic exchange resin in its $OH^-$ form ]. Each resin bed was washed with 3600 ml. water. The combined pale yellow eluant was concentrated at 45° C. under vacuum to a syrup weighing 140 g.

Xylose content of syrup = 28.7 g.
14.4% on Masonex

EXAMPLE 3

The concentrated deionized solution prepared in example 2 was mixed with 11.8 g. Raney nickel catalyst (50 percent aqueous suspension) and 1.67 g. calcium carbonate. The suspension was hydrogenated at 100° C. 450 p.s.i.g. for 4.5 hours. After completion of the hydrogenation, the mixture was cooled to room temperature, and filtered to remove the catalyst. The filtered mixture was washed with three portions of water totaling 150 ml. water. The clear, colorless filtrate was deionized by first passing it through 120 ml. Amberlite IR–120 and then through 120 ml. of Amberlite IRA–93. Each resin bed was washed with 360 ml. water. The combined eluant was concentrated at 40°–45° C. to a syrup (weight: 53.2 g.). To the syrup there was added 25 ml. methanol and several seed crystals of xylitol. The viscous solution was stirred at −5° C. for 24 hours. (Crystallization started after ca. 0.5 hour.) The solids were separated from the mixture by filtering the mixture. The isolated solids which were xylitol, were washed with three portions totaling 120 ml. methanol (precooled to −10° C.). The xylitol was dried under vacuum at 35° C. to constant weight of 22.4 g. The mother liquor and washes were combined and concentrated as before to a syrup (weight 27.5 g.), 15 ml. methanol and several seed crystals of xylitol were added and the mixture refrigerated at −5° C. for two days. A second crop of xylitol was filtered, washed with a small amount of methanol (precooled to −10° C.) and dried at 35° C. under vacuum to 1.3 g. The results of the isolation are as follows:

| Xylitol Recovery | Crop I | Crop II |
| --- | --- | --- |
| Weight | 22.4 g. | 1.3 g. |
| Assay | 97.3% | 95.0% |
| Yield | | |
| on Xylose | 76.0% | 4.3% |
| on Masonex | 10.9% | 0.6% |

EXAMPLE 4

Through a column containing 40.0 g. Permutit DR resin there was passed 50.0 g. of lignin-free spent sulfite liquor having the following composition:

| Components | % by Weight |
| --- | --- |
| 1. Water | 26.4 |

| 2. Solids | 73.6 |
|---|---|
| Carbohydrates | |
| a. D-arabinose | 1.7 |
| b. D-xylose | 48.4 |
| c. D-galactose | 2.0 |
| d. D-glucose | 2.1 |
| e. D-mannose | 4.7 |
| f. other wood derivatives | 14.7 |

The sulfite liquor was passed through the resin at a rate of 2.0 ml./min. The pale yellow eluant (pH 2.9) was adjusted to pH 5.0 with one drop of 1N sodium hydroxide.

An inoculum was prepared from 50 ml. water, 12.0 g. Saccharomyces cerevisiae (dry active bakers yeast. ATCC 7754), 0.5 g. dipotassium hydrogen phosphate, 0.5 g. ammonium dihydrogen phosphate, 0.5 g. yeast extract and 1.0 g. glucose. The mixture was incubated at 27°–30° C. for 30 minutes with gentle agitation in a 500 ml. three-neck round bottom flask. During this time vigorous $CO_2$ evolution commenced.

To the inoculum was added the above eluant, diluted with water to 135 ml. during a two hour period. The fermentation was continued at 27°–30° C. for 15 hours. During this period the initial strong $CO_2$ evolution abated and almost completely ceased.

Analysis of Fermentation Solution

| Xylose | = 23.1 g. |
|---|---|
| | = 46.2% based on the sulfite liquor |
| Galactose | = 0.3 g. |
| | = 0.6% based on the sulfite liquor |
| Glucose and mannose | = absent |

The fermentation broth was filtered through an asbestos pad (6μ porosity) to remove the yeast which was washed three times with a total of 150 ml. water. The yeast was stored at 0° C. for later use.

The clear, yellow filtrate was passed successively through two ion exchange resin columns. The first column contained 25 ml. Amberlite IR-120 (H$^+$) resin, and the second column contained 25 ml. Amberlite IRA-93 (OH$^-$) resin. Each resin bed was washed with 50 ml. water. The combined pale yellow eluant was concentrated to 85 ml.

This solution was mixed with 6.5 g. Raney Nickel catalyst (50 percent aqueous suspension) and 0.65 g. calcium carbonate. The suspension was hydrogenated at 100° ±5° C., 450 p.s.i.g. for 4.5 hours. After completion of the hydrogenation the mixture was cooled to room temperature and filtered to remove the catalyst. The catalyst was washed with three portions of water totaling 60 ml.

The clear, colorless filtrate was deionized by passing it through 25 ml. Amberlite IR-120 (H$^+$) resin followed by passage through 25 ml. Amberlite IRA-93 (OH$^-$) resin. Each resin was washed with 50 ml. water.

The combined eluant was concentrated in vacuo at 40°–45° C. to a syrup weighing 31.6 g. To the syrup was added 15.8 ml. methanol and several seed crystals of xylitol. The colorless solution was stirred at 25° C. The crystallization slurry was cooled at 0° C. for 15 hours. The crystalline solids were filtered from the mother liquor. The isolated solids which was the product xylitol were washed with three portions totaling 60 ml. methanol (precooled to −10° C.). The xylitol was dried under vacuum at 35° C. to constant weight of 20.4 g.

The mother liquor and washes were combined and concentrated as before to a syrup (weight:10.1 g.). 5.0 ml. methanol and several seed crystals of xylitol were added and the mixture refrigerated for two days. A second crop of xylitol was filtered, washed with a small amount of methanol (precooled to −10° C.) and dried at 35° C. under vacuum to 2.0 g.

| Xylitol Recovery | Crop I | Crop II |
|---|---|---|
| Weight | 20.4 g. | 2.0 g. |
| Assay | 98.6% | 95.3% |

| Yield | | |
|---|---|---|
| on Xylose | 83.3% | 7.8% |
| on Sulfite Liquor | 40.2% | 3.8 |

EXAMPLE 5

To 800 ml. of 0.175N sulfuric acid, there were added 200.0 g. of dried, ground oathulls having the following composition:

| 1. Water | 7.7 |
|---|---|
| 2. Solids | 92.3 |
| a. Ash | 5.4 |
| b. Carbohydrates present in their polysaccharide form | |
| 1. Arabinose | 2.5 |
| 2. Xylose | 22.1 |
| 3. Galactose | 0.7 |
| 4. Glucose | 3.8 |
| 5. Mannose | trace |
| 6. Other hemicelluloses | 9.8 |

The suspension was heated in six sealed 200 ml. heavy-walled Pyrex pressure flasks at 120° C. for three hours. The dark yellow hydrolysis mixtures were cooled, combined and filtered. The solids were washed with 3×200 ml. water and dried to 104.8 g.

The clear, yellow filtrate containing 44.2 g. xylose was partially neutralized to pH 4.5 with 4.4 g. calcium hydroxide and fermented as shown below.

An inoculum was prepared from 100 ml. water, 22 g. Saccharomyces cervisiae (dry active bakers yeast. ATCC 7754), 0.5 g. dipotassium hydrogen phosphate, 0.5 g. ammonium dihydrogen phosphate, 0.5 g. yeast extract, and 2.0 g. glucose. The mixture was incubated at 27°–30° C. for 30 minutes with gentle agitation in a 2 liter three-neck round bottom flask. Rapid $CO_2$ evolution commenced. To the inoculum was added the hydrolyzate, which was concentrated in vacuum at 40° C. to 852 ml., during eight hours. The fermentation was continued for 16 hours. During this period the initial strong $CO_2$ evolution abated and almost completely ceased.

The fermentation broth was filtered through an asbestos pad (6μ porosity) to remove the yeast which was washed three times with a total of 150 ml. water. The xylose content of the clear, dark yellow filtrate was 42.3 g. The solution was deionized by passing it through 200 ml. of Amberlite IR-120 resin in the H$^+$form followed by passage through 280 ml. of Amberlite IRA-93 resin. Each resin bed was washed with 450 ml. water.

The combined pale yellow eluant was concentrated at 40° C. under vacuum to a syrup weighing 95 g.

EXAMPLE 6

The concentrated deionized syrup prepared in example 5 was converted to xylitol utilizing the procedure given in example 3.

We claim:

1. A process for producing xylose from lignin-free hemicellulosic materials wherein the polysaccharides contained therein have been converted to monosaccharides comprising:
   a. fermenting said material in an aqueous medium with a hexose fermenting yeast which is inert to pentoses and
   b. passing said fermented aqueous medium first through a cationic ion exchange resin bed and through an anionic ion exchange resin bed to produce aqueous medium containing xylose free of hexoses.

2. The process of claim 1 wherein said yeast is Baker's yeast.

3. The process of claim 2 wherein said fermentation is carried out at a pH of 3 to 7 and at a temperature of from 5° to 40 °C.

4. A process for producing xylitol from lignin-free hemicellulosic materials wherein the polysaccharides contained therein have been converted to monosaccharides comprising:
   a. fermenting said material in an aqueous medium with a hexose fermentating yeast which is inert to pentose;

b. passing said fermented aqueous medium through a cationic ion exchange resin bed and through an anionic ion exchange resin bed and through an anionic ion exchange resin bed to produce an aqueous medium containing xylose free of hexoses;

c. hydrogenating the aqueous effluent from the anionic exchange resin bed to convert the xylose in said aqueous medium to xylitol.

5. The process of claim 4 wherein said hydrogenation is carried out in the presence of a Raney-nickel catalyst.

6. The process of claim 4 wherein said yeast is Baker's yeast.

7. The process of claim 4 wherein said fermentation is carried out at a pH of 3 to 7 and at a temperature of from 5° to 40° C.

8. A process for producing xylose from aqueous wood extracts comprising:

a. hydrolyzing said aqueous wood extracts in an aqueous medium with an acid hydrolyzing agent to form an aqueous solution containing the lignins as a water insoluble precipitate;

b. removing the precipitated lignins from the resultant aqueous solution;

c. fermenting said aqueous solution with a hexose fermenting yeast which is inert to pentoses;

d. passing said fermented aqueous medium through a cationic ion exchange resin bed then through an anionic ion exchange resin bed to produce an aqueous medium containing xylose free of hexose.

9. The process of claim 8 wherein said hydrolysis is carried out with sulfuric acid.

10. The process of claim 8 wherein said yeast is Baker's yeast.

11. A process for producing xylitol from aqueous wood extracts comprising:

a. hydrolyzing said aqueous wood extracts in an aqueous medium with an acid hydrolyzing agent to form an aqueous solution containing the lignins as a precipitate;

b. removing said lignins from said aqueous solution;

c. fermenting said lignin-free aqueous solution with a hexose fermenting yeast which is inert to pentoses;

d. passing said fermented aqueous medium through a cationic ion exchange resin bed and through an anionic ion resin exchange bed to produce an aqueous effluent containing xylose free of hexose; and e. hydrogenating said aqueous effluent containing xylose to convert the xylose to xylitol.

12. The process of claim 11 wherein said hydrogenation is carried out in the presence of a Raney-nickel catalyst.

13. The process of claim 11 wherein said yeast is Baker's yeast.

14. A process of producing xylose from spent sulfite liquors containing lignins and monosaccharides comprising:

a. passing said spent sulfite liquors in an aqueous medium through an anionic ion exchange resin bed to remove the lignins from said aqueous medium;

b. fermenting the lignin-free aqueous effluent with a hexose fermenting yeast which is inert to pentoses; and c. passing said fermented aqueous effluent through a cationic ion exchange resin bed and through an anionic ion exchange resin bed to produce an aqueous effluent containing xylose free of hexoses.

15. The process of claim 14 wherein said yeast is Baker's yeast.

16. The process of claim 14 wherein said fermentation is carried out at a pH of 3 to 7 and at a temperature of from 5° to 40° C.

17. A process of producing xylitol from spent sulfite liquors containing lignins and monosaccharides comprising:

a. passing said spent sulfite liquors in an aqueous medium through an anionic ion exchange resin bed to remove the lignins from said aqueous medium;

b. fermenting said lignin-free aqueous medium with a hexose fermenting yeast which is inert to pentoses;

c. passing said fermented aqueous medium through a cationic ion exchange resin bed and through an anionic ion exchange resin bed to produce an aqueous effluent containing xylose free of hexose; and d. hydrogenating said aqueous effluent to convert the xylose therein to xylitol.

18. The process of claim 17 wherein said yeast is Baker's yeast.

19. The process of claim 17 wherein said fermentation is carried out at a pH of 3 to 7 and at a temperature of from 5° to 40° C.

20. The process of claim 17 wherein said hydrogenation is carried out in the presence of a Raney-nickel catalyst.

* * * * *

PO-1050
(5/69)

UNITED STATES PATENT OFFICE
CERTIFICATE OF CORRECTION

Patent No. 3,627,636      Dated December 14, 1971

Inventor(s) Gerald Myer Jaffe, William Szkrybalo and Hans Weinert

It is certified that error appears in the above-identified patent and that said Letters Patent are hereby corrected as shown below:

Column 8, line 63 of claim 1 delete word "first"

Column 9, line 3 of claim 4 delete - and anionic ion exchange resin bed (repeated)

Column 9, line 27 of claim 8d

"then through"

should be and through

Signed and sealed this 19th day of September 1972.

(SEAL)
Attest:

EDWARD M. FLETCHER, JR.          ROBERT GOTTSCHALK
Attesting Officer                   Commissioner of Patents